United States Patent [19]

Bratton

[11] 4,330,872
[45] May 18, 1982

[54] COMMON-OFFSET-DISTANCE SEISMIC TRACE FILTERING

[75] Inventor: Robert H. Bratton, Dallas, Tex.

[73] Assignee: Mobil Oil Corporation, New York, N.Y.

[21] Appl. No.: 508,597

[22] Filed: Sep. 23, 1974

[51] Int. Cl.³ .............................................. G01V 1/36
[52] U.S. Cl. ...................................... 367/43; 367/38; 367/53; 367/59; 364/421
[58] Field of Search .............. 340/15.5 MC, 15.5 DP, 340/15.5 CP, 15.5 F; 367/38, 43, 53, 56, 59; 364/421

[56] References Cited

U.S. PATENT DOCUMENTS

| | | | |
|---|---|---|---|
| 3,381,266 | 4/1968 | Harris | 340/15.5 MC |
| 3,651,451 | 3/1972 | Ruehle | 340/15.5 DP |
| 3,668,620 | 6/1972 | Mathieu et al. | 340/15.5 DP |
| 4,203,161 | 5/1980 | Johnson et al. | 367/43 |

*Primary Examiner*—Howard A. Birmiel
*Attorney, Agent, or Firm*—Charles A. Huggett; Michael G. Gilman; George W. Hager

[57] ABSTRACT

A multiple coverage seismic exploration technique provides for a plurality of seismic trace recordings along a line of exploration. From these recordings, sets of common-offset-distance traces are gathered. Initial estimates are made of the apparent dips associated with the seismic reflection signals across each set of common-offset-distance traces. These initial dip estimates are smoothed and the sets of common-offset-distance traces filtered along the apparent dips associated with the smoothed dip estimates to enhance the signal-to-noise ratio of the primary reflection signals.

4 Claims, 10 Drawing Figures

SIGN CONVENTION $\ell$ FOR DIP TRAJECTORIES

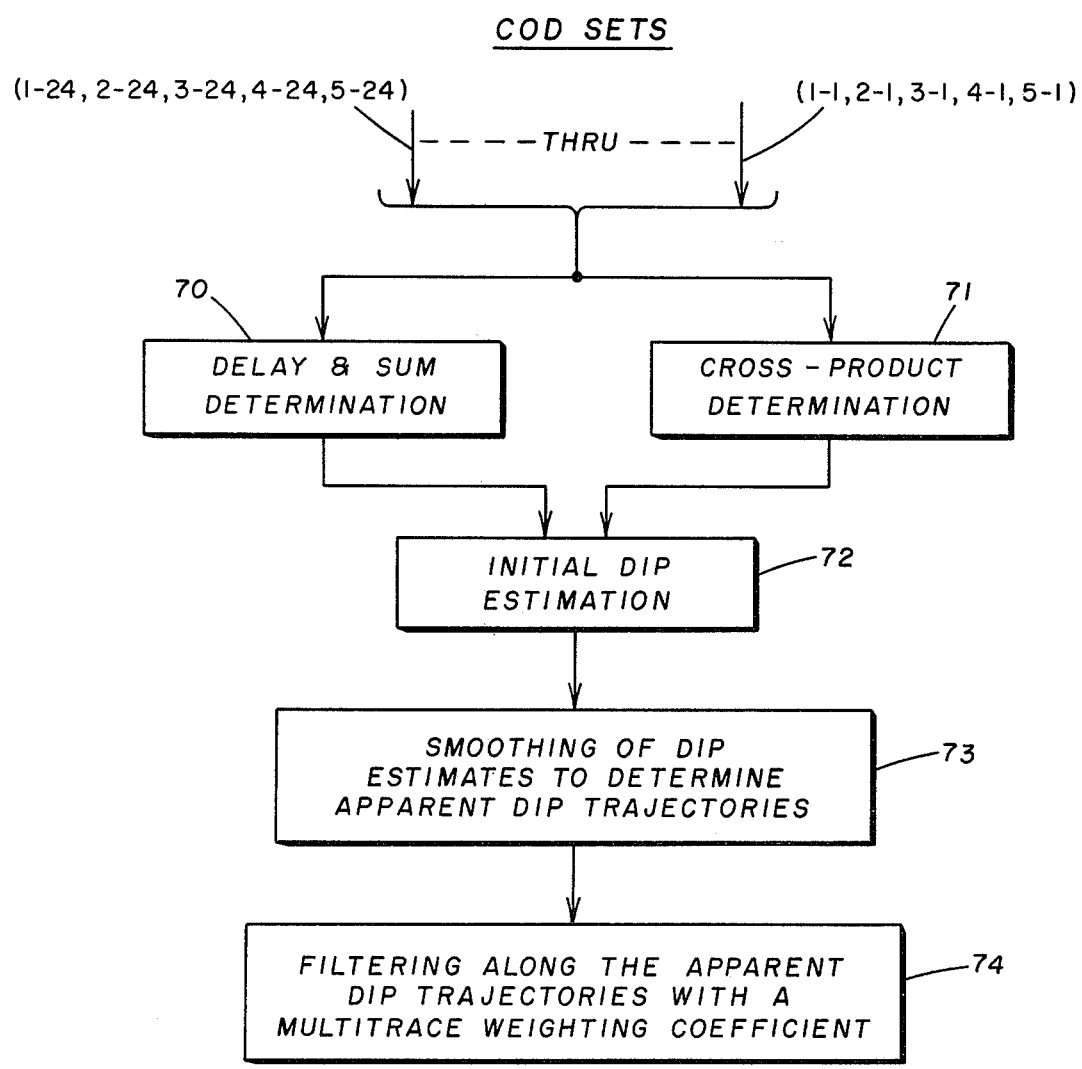

COMMON-OFFSET-DISTANCE SEISMIC TRACE FILTERING

BACKGROUND OF THE INVENTION

This invention relates to seismic exploration and more particularly to a method for the enhancement of the signal-to-noise ratio of recorded seismic data in order to make possible the production of a seismic section in which subsurface anomalies are more readily discernible to an interpreter.

In seismic exploration, seismic energy is generated at a shotpoint at or near the surface of the earth, is reflected from subsurface interfaces between layers of the earth, and is received by a spread of geophones on the surface of the earth. The geophone signals are conventionally gathered and recorded in the form of a suite of common-depth-point (CDP) seismic traces. From these recorded CDP seismic traces the subsurface interval velocities can be determined. Such a CDP data gathering and recording technique and a continuous velocity determination technique are disclosed in U.S. Pat. No. 3,651,451 to William H. Ruehle. An accurate velocity determination is quite important in the interpretation of the nature and extent of the subsurface layering. One of the problems encountered in such velocity determination is that incoherent noise signals are also recorded on the seismic traces along with the primary reflection signals. The method of the present invention is particularly useful in enhancing the strength of the primary reflection signals on the seismic traces in the presence of such incoherent noise signals prior to the conventional CDP data gathering operation and the processing of the CDP seismic traces by means of conventional velocity determination techniques.

SUMMARY OF THE INVENTION

In accordance with the present invention, recorded seismic traces are gathered together in sets of traces from successive shots wherein all traces in each set have the same source-to-receiver offset distance. These sets of common-offset traces are hereinafter termed common-offset-distance (COD) traces, each set having nearly the same moveout characteristic. The process of the present invention makes use of the trace-to-trace moveout redundancy associated with such a set of COD seismic traces.

In one aspect of the invention, initial dip estimates are determined for the seismic reflection signals along the seismic traces within each set of COD traces. These initial dip estimates are smoothed for each set of COD traces to provide final dip estimates. This smoothing minimizes the influence of any erroneous dip estimates. Each set of COD traces is then filtered by means of a multichannel weighting coefficient along the apparent dip of the seismic reflection signals as indicated by such final dip estimates.

More particularly, absolute values of sample points that lie within a time window and along a first selected dip trajectory across a selected number of contiguous seismic traces of each COD set are summed to provide a sum-of-magnitude signal. A cross-product signal is also provided by the summation of the mutual products along the first selected dip trajectory of those portions of all possible trace pairs that lie within the time window. Next, a sum-of-magnitude signal and a cross-product signal are provided for each of a plurality of different dip trajectories within the time window. The time window is thereafter incremented along the time axis of the selected group of traces within the set of COD traces and new sum-of-magnitude and cross-product signals determined again for a plurality of different dip trajectories.

All the sum-of-magnitude and cross-product signals determined for the same window position and the same dip trajectory are multiplied together to provide a merit function signal. The dip trajectory associated with the largest value of the merit function signal for each time window position is selected as the initial dip estimate of the seismic reflection signal of the sample point located at the midpoint of the center trace within the time window.

These initial dip estimates along the seismic traces are then smoothed to remove the effect of any erroneous estimates. This smoothing is carried out by determining the median value of the initial dip estimates that form a matrix of all initial dip estimates that lie within a second time window along said set of traces. The initial dip estimate that lies at the midpoint of the center trace within this second time window is replaced with a final dip estimate as represented by the median value determined from the matrix of initial dip estimates within the second time window.

These final dip estimates are then filtered by means of a multichannel weighting coefficient along the apparent dip of the seismic reflection signals as indicated by the final dip estimates. The multichannel filter coefficients are proportional to the relative magnitudes at those points along a normal distribution curve that define the midpoints of equal areas under the curve. The number of such equal areas is the same as the number of seismic traces included within the set of COD traces being operated upon by the filter.

BRIEF DESCRIPTION OF THE DRAWINGS

FIG. 4 is a detailed analog flow diagram of the steps carried out in processing the common-offset-distance seismic traces of FIG. 3.

DESCRIPTION OF THE PREFERRED EMBODIMENT

Figure 1:
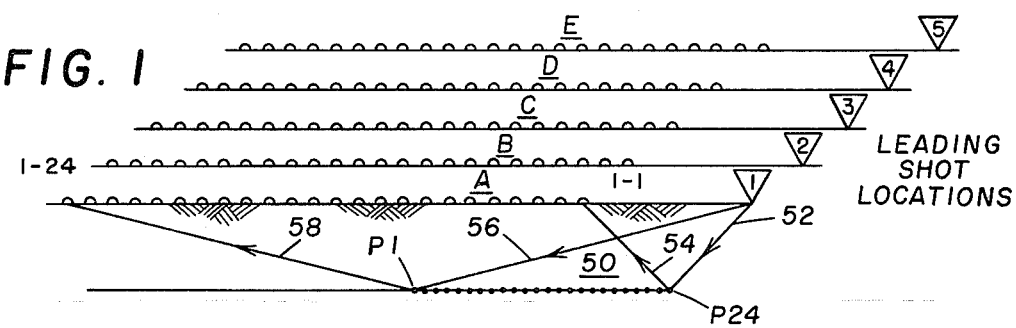
FIG. 1 illustrates a multiple-coverage seismic exploration technique.

Referring to FIG. 1, there is illustrated a field technique that might be used for producing the multiple coverage seismic data which is suitable for use in carrying out the invention. Five field layouts A-E are utilized for purposes of illustration and are placed one above the other in FIG. 1 for ease in representing the overlapping coverage. In these field layouts, seismic energy is produced during a first recording at shotpoint 1, for example, and seismic reflection signals are detected along the receiver spread A, containing 24 detectors. These detectors receive reflection signals from subsurface interfaces such as the interface 50. Reflection signals are received from other subsurface interfaces also by the detectors of spread A, but only interface 50 is illustrated for clarity. For example, a signal produced at the nearest detector in spread A to the shotpoint 1, and designated as receiver 1-1, delineates depth point P24 on the subsurface interface 50. Throughout the specification reference characters identifying detector stations give the shotpoint number first and then the detector number. Seismic energy travels downward from shotpoint 1 by way of raypath 52 and is reflected upward to the detector 1-1 by way of raypath 54. Likewise, seismic energy travels downward by way of raypath 56 to depth point P1 where the energy is reflected upward by way of raypath 58 to the far detector 1-24. A reproducible recording is made from each of the detectors in spread A. Usually in seismic exploration, magnetic tape recordings are made on a multichannel recording device. These magnetic tape recordings can then be processed to provide for a visual multitrace recording in which the output of each detector is represented by a single seismic trace.

Now for a second recording, the detector spread is advanced to the position of spread B as illustrated in FIG. 1. Likewise, the shotpoint advances to shotpoint 2. Again, a multichannel recording is made from seismic reflections received at each detector of spread B, as seismic energy generated at shotpoint 2 is reflected from the subsurface interface 50. The process of moving the shotpoint and detector spreads continues through shotpoint 5 and spread E. It can be appreciated that any number of spread configurations or layouts may be utilized along with any number of recordings, only five recordings for spreads A-E being illustrated in FIG. 1 by way of example.

Figure 2:
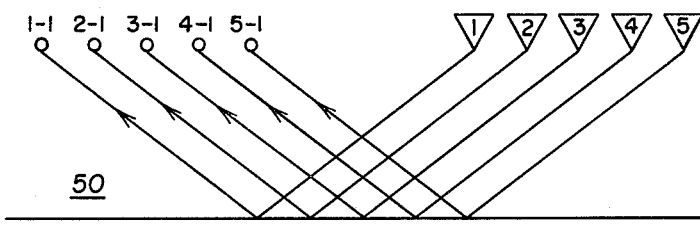
FIG. 2 illustrates a set of source-to-detector relationships from FIG. 1 wherein the source-to-detector spacings are identical.

It can be observed from FIG. 1 that in each of the recordings the distance along the surface of the earth from the shotpoint to each receiver remains the same. More particularly, the distances from each of the shotpoints to the nearest or first receiver along the surface of the earth is identical. Hence, this type of coverage has been termed common-offset-distance (COD) coverage. This COD relationship of the seismic signals received by the nearest receiver at the receiver positions 1-1, 2-1, 3-1, 4-1, and 5-1 is illustrated in FIG. 2. There will be a similar COD relationship for each of the remaining receivers with the five shotpoints, these relationships not being illustrated however.

Figure 3:
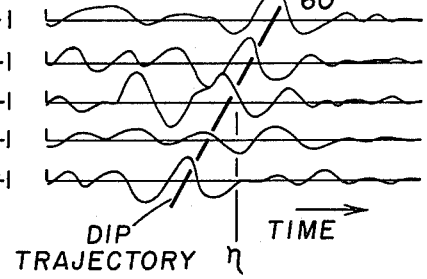
FIG. 3 is a set of common-offset-distance seismic traces obtained by the recording of seismic reflections by the source-to-detector relationships of FIG. 2.

Referring now to FIG. 3, there is illustrated a group of COD traces as might be recorded by those receivers nearest to the shotpoints, these traces being identified as 1-1, 2-1, 3-1, 4-1, and 5-1. If the subsurface includes a dipping interface, the reflection signals on each of these traces will not be in alignment but will lie along a dip trajectory, such as at 60, that identifies this dipping interface. It is a specific feature of the present invention to estimate such a dip trajectory as is associated with a dipping interface.

Referring now to FIG. 4, there is illustrated an analog flow diagram of a process for carrying out the present invention of enhancing the signal-to-noise ratio of sets of COD seismic traces obtained as are described above in conjunction with the illustrations of FIGS. 1-3.

Figure 5:
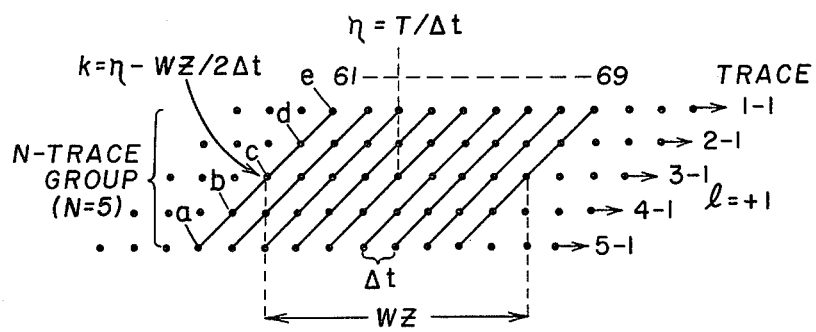
FIG. 5 illustrates sets of data sample points along a selected dip trajectory at spaced intervals along the time axis of each of the seismic traces within the common-offset-distance set of traces of FIG. 3.

Initially, steps 70 and 71 are carried out concurrently on the COD sets. Looking first at step 70, a plurality of delay and sum operations are carried out, each such operation being for a different assumed orientation of the dip trajectory. This may best be understood by referring to FIG. 5 which illustrates, for example, a series of nine data sample points at a $\Delta t$ sampling interval along the time axis of each of the five COD seismic traces of FIG. 3. It is to be noted that only those sample points that lie within a selected time window WZ along the time axis are utilized. The absolute value of the summed sample points at the $\Delta t$ intervals is determined along a selected dip trajectory as is illustrated in FIG. 5 by the heavily darkened lines joining the $\Delta t$ sample points across the COD set of traces within the time window WZ. For example, the absolute value of the sum of the sample points from the five COD traces along the heavily darkened orientation line 61 is taken. All other data sample points within the time window WZ are similarly summed along the orientation lines 62-69 and their respective absolute values obtained. After obtaining the magnitude of each of these individual sums, a total summation is determined by adding the individual magnitudes together. The output of step 70 is consequently a sum-of-magnitude determination (SOM) for the selected time window and the selected orientation of the dip trajectory.

Figure 6:
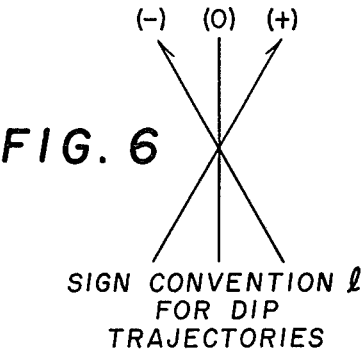
FIG. 6 illustrates the direction of orientation of selected dip trajectories.

Next, the selected orientation of lines 61-69 is changed and a new SOM determination made for the same time window. A plurality of such selected orientation changes are made both in a positive and negative direction as illustrated in FIG. 6 and an SOM determination made for each such selected orientation. Examples of SOM determinations that might be obtained for selected orientations of $-8$ to $+8$ are shown in the left-hand column of TABLE I. These SOM values have been normalized, with the largest value set to unity.

Next, the time window is incremented along the time axis of the COD set of traces and a new set of SOM determinations are made for each of the selected orientations of the dip trajectory. This incrementing of the time window is continued until all desired portions of the COD set of traces have been processed. The parameter $l$ is the selected orientation of the dip trajectory and assumes the values $0, \pm 1, \pm 2, \ldots \pm L$. The SOM values are referenced to the center time of the time window, and $2L+1$ SOM values are produced.

Concurrently with the operation of step 70, step 71 is carried out. Step 71 is a cross-product operation in which a summation of mutual products from all possible trace pairs is calculated. This summation of mutual products is carried out along each selected orientation of the dip trajectory and summed over the limits of the time window. For example, the data samples along the orientation line 61 of FIG. 5 for the five traces shown are points a-e. Consequently, the summation of mutual products along orientation line 61 is:

$$\Sigma_{61} = ab + ac + ad + ae + bc + bd + be + cd + ce + de \quad (1)$$

Next, all the cross-products from lines 61-69 are summed to yield a cross-product (CP) for the selected time window and the selected orientation of the dip trajectory. Again, as in step 70, step 71 generates a CP for 2L+1 selected orientations of l within the time window. Examples of CP determinations that might be obtained for selected orientations of −8 to +8 are shown in the center column of TABLE I. These CP values have been normalized, with the largest value set to unity.

Next, the time window is incremented along the time axis of the COD set of traces and a new set of CP determinations made for each of the selected orientations of the dip trajectory. This incrementing of the time window is continued until all desired portions of the COD set of traces have been processed.

These sum-of-magnitude and cross-product values, SOM and CP, from steps 70 and 71 are measurements of probable occurrence of a seismic reflection signal. These two measurements are multiplied in the next step 72 to provide for a merit function MF. Since the SOM and CP values are independent measurements, their product will yield the highest certainty in estimating the apparent dip of the reflecting subsurface interface. These merit functions are listed for all positive CP values in the right-hand column of TABLE I. As can be seen in the example of TABLE I, the maximum value of the merit function is 0.992698 with an associated dip trajectory of 0 millisecond.

TABLE I

| Dip Trajectory | Normalized Sum-of-Magnitude | Normalized Cross-Product | Merit Function |
| --- | --- | --- | --- |
| −8 | .787756 | −.264760 | 0.000000 |
| −4 | 1.000000 | .846711 | .846711 |
| 0 | .992698 | 1.000000 | .992698 |
| +4 | .829518 | .393523 | .326434 |
| +8 | .816803 | .143218 | .116981 |

In accordance with the operation of steps 70-72, a merit function is derived for each increment of the time window along the time axis of the COD set of traces. The initial dip estimate associated with each maximum value of the merit functions for each time window location is utilized as the initial dip estimate for the data sample point that is located at the midpoint of the center trace within the specified time window location.

After an initial dip estimate is derived for each time window increment along the set of COD traces, a smoothing operation is carried out in step 73 to determine trends and to eliminate erroneous dip estimates. This smoothing operation determines the median dip values for selected initial dip estimates at time increments INC along the time axis.

In this smoothing operation a second time window utilizing a matrix of the initial dip estimates spaced at INC sampling intervals along the center trace and either side of the center trace of the COD set of traces is selected. For a 3×5 matrix, for example, fifteen initial dip estimates at five INC sampling points along the three contiguous traces are utilized in the median determination and the median value so determined is stored as the replacement dip estimate for the center sample point of the matrix. This second time window is then incremented along the time axis so that those initial dip estimates spaced at time increments INC apart along the seismic trace are replaced with replacement estimates based upon the median values from all those initial dip estimates within the matrix itself.

Figure 7:
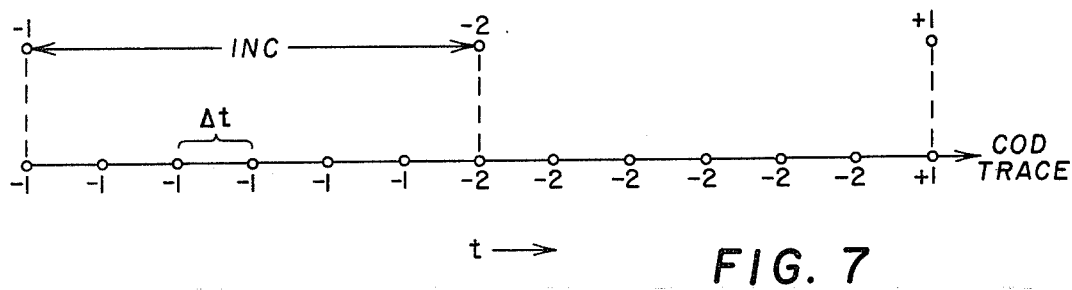
FIG. 7 illustrates the smoothed dip estimates from step 73 of FIG. 4.

These median dip values at the INC sampling points are next used to provide dip estimates at the Δt sampling points located between the coarser INC sampling points. For example, the median dip value for the first of the INC sampling points is used as the replacement dip estimate for all the successive Δt sampling points from the first to the second INC sampling point, but not including the second INC sampling point. Similarly, the median dip value for the second INC sampling point is used as the replacement dip estimate for all the successive Δt sampling points from the second to the third INC sampling point, but not including the second INC sampling point. Consequently, the replacement dip estimates along a COD trace might appear as shown in FIG. 7, for example. In this manner, the initial dip estimates at the Δt sampling points have all been replaced in accordance with the smoothing operation of this step 73, thereby minimizing the effect of erroneous dip estimates.

Figure 8:
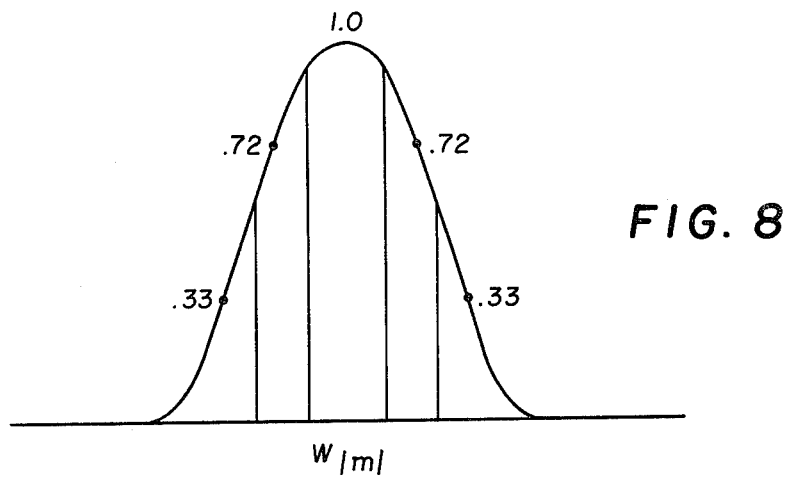
FIG. 8 illustrates the weighting coefficients utilized in the multichannel filtering operation of step 74 of FIG. 4.
Figure 9:
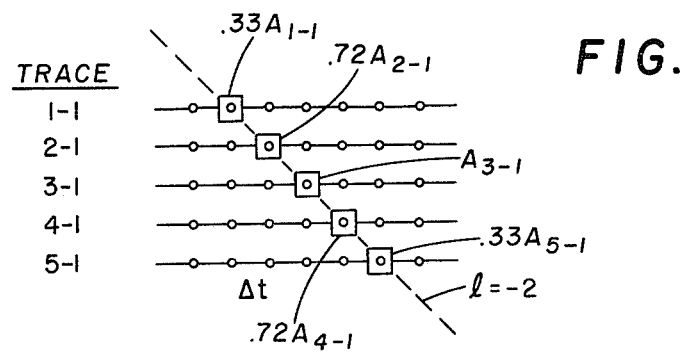
FIG. 9 illustrates the time-dependent alignment of the weighting coefficient utilized in the multichannel filtering operation of step 74 of FIG. 4.

The final step in the process, step 74, is a filtering of the sets of COD traces by means of a multichannel weighting coefficient $W|_m|$ along the apparent dips of the seismic reflection signals resulting from the smoothing operation of step 73. In the preferred embodiment, the weighting coefficients are represented by the relative amplitudes of the midpoints of five equal areas (for the five COD traces) under a normal distribution curve as illustrated in FIG. 8. Consequently, the filtered output for a given sampling point along COD trace 3-1, with a −2 dip estimation, for example, will be the sum of the weighted amplitudes of the five traces lying along the orientation line l= −2:

$$A_{3\text{-}1} = 0.33A_{1\text{-}1} + 0.72A_{2\text{-}1} + A_{3\text{-}1} + 0.72A_{4\text{-}1} + 0.33A_{5\text{-}1} \quad (2)$$

The primary seismic reflections of the filtered COD seismic traces are now enhanced with respect to the noise signals on the seismic traces and are now ready for processing by conventional common-depth-point (CDP) operations and the production of a conventional seismic section recording.

In such operations, the seismic traces are gathered into sets of common-depth-point (CDP) traces in which each trace of the set represents reflections from a common subsurface point. The primary reflection signals along these traces in each CDP set all fall along a generally hyperbolic curve known as the normal moveout curve. The seismic traces are compensated for the time differentials in the occurrence of the primary reflection signals caused by this normal moveout. Such compensation aligns all the primary reflection signals at the same point on the time axis of the seismic traces. The seismic traces are then conventionally stacked to form a composite trace for each CDP point, such stacking again enhancing the primary reflection signals while multiples and noise are attenuated. These composite traces are then conventionally recorded in side-by-side relationship in the form of a seismic section. Such a seismic section indicates continuous primary seismic reflections and is a useful tool for the geophysicist in determining the acoustic velocity characteristics of the earth associated with such continuous reflections. For a more detailed description of such a CDP data gathering operation along with a continuous velocity estimation, reference is made to the aforementioned U.S. Pat. No. 3,651,451 to William H. Ruehle.

Figure 10:
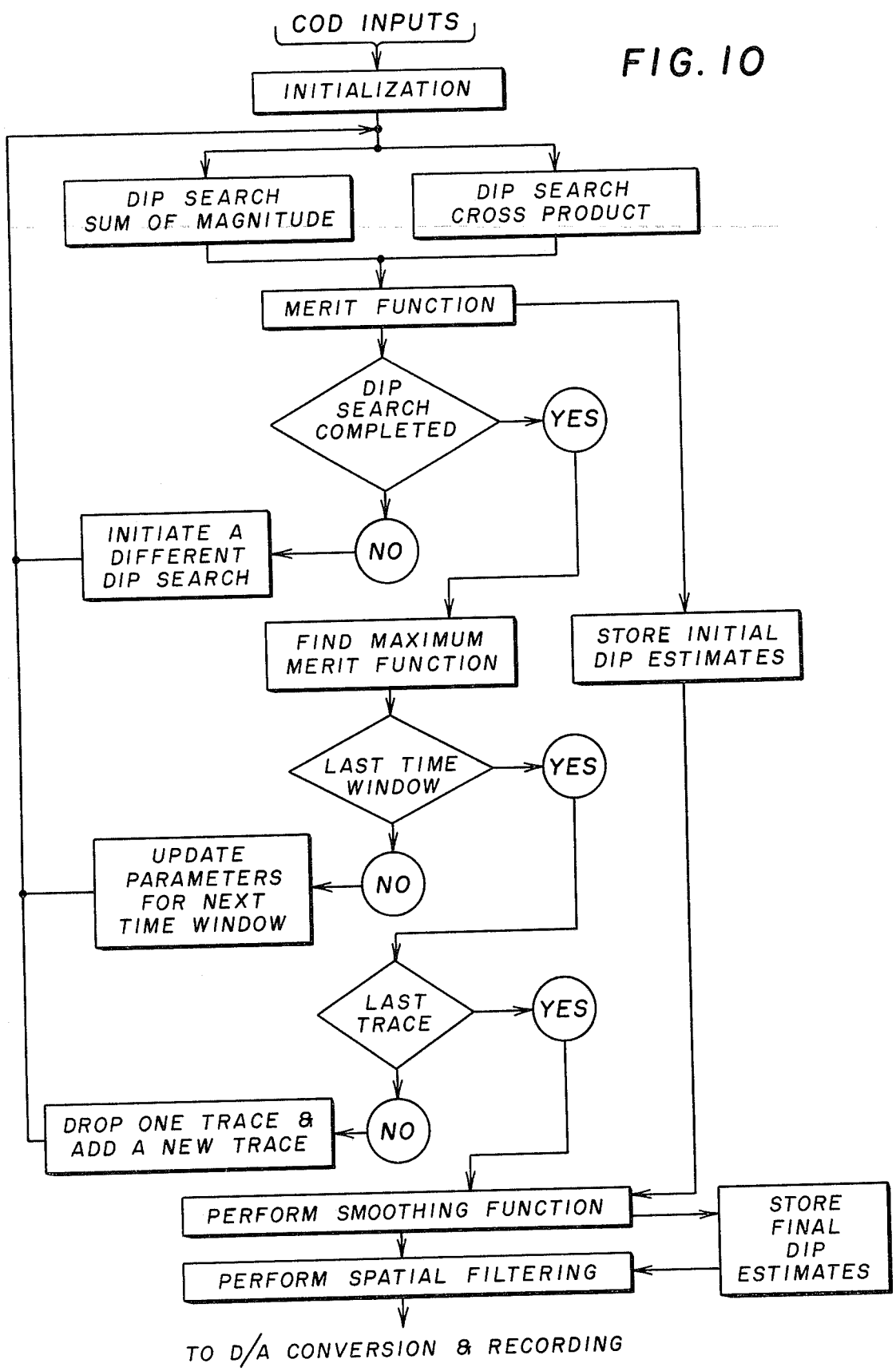
FIG. 10 is a flow diagram for carrying out the steps of FIG. 4.

From the foregoing it will be apparent that the process of the present invention can be practiced either with the use of analog computing apparatus such as delay lines, shift registers, drum recorders, etc., or with the use of digital computing apparatus. In one particular embodiment of a digital computing system a Control Data Corporation Model 6600 General Purpose Digital Computer is utilized along with the following input-/output components:

Control Computer, 65K Memory
6602 Console Display
6681 Data Channel Converter
405 Card Reader
3447 Card Reader Controller
501 Line Printer
3256 Line Printer Controller While the invention can be implemented by various programs, FIG. 10 illustrates a flow diagram of a computer program in FORTRAN language for instructing such a general purpose digital computer to carry out the process of the present invention. Most FORTRAN programming involves looping, the repetition of groups of statements of varying parameters. The control statement involved is the "DO" statement. For a more detailed understanding of the use of FORTRAN statements, reference may be made to "Introduction to FORTRAN" by S. C. Plumb, McGraw-Hill Book Company, New York, N.Y. (1964).

I claim:

1. In seismic exploration wherein a multiple coverage exploration technique is used to obtain seismic traces from source and receiver positions along a line of exploration, the machine implemented method of enhancing the signal-to-noise ratio of said seismic traces, comprising the steps of:

(a) gathering said seismic traces into sets having common source-to-receiver offset distances, (b) summing the magnitudes of the absolute values of a selected number of contiguous seismic traces along a first selected orientation for the dip trajectory across the seismic traces of each of said sets to obtain a sum-of-magnitude signal at each of a plurality of first sampling points within a first time window, (c) summing the mutual products of the selected number of contiguous seismic traces along said first selected orientation for the dip trajectory of those portions of all possible trace pairs that lie within said first time window to obtain a cross-product signal for each of said plurality of first sampling points, (d) repeating steps (b) and (c) for a plurality of selected orientations for the dip trajectory, (e) incrementing said first time window along the time axis of said sets of traces and repeating steps (b)–(d) for each subsequent first time window position to obtain a plurality of sum-of-magnitude and cross-product signals, (f) multiplying the sum-of-magnitude and cross-product signals obtained from the same first time window position and the same selected orientation for the dip trajectory to obtain a plurality of merit function signals, (g) selecting the orientation for the dip trajectory associated with the largest value of the merit function signal for each first time window position as the initial dip estimate of the seismic reflection signal at the first sampling point that lies nearest the midpoint of the center trace within such first time window position, (h) smoothing the initial dip estimates for each of said sets of common-offset-distance traces to provide final dip estimates, the influence of erroneous dip estimates being thereby minimized, and (i) filtering said sets of common-offset-distance traces along the apparent dips of the seismic reflection signals as indicated by said final dip estimates.

2. The method of claim 1 wherein said step of smoothing the initial dip estimates comprises the steps of:

(a) determining the median value of the initial dip estimates at a plurality of second sampling points that lie within a second time window of said set of traces, (b) replacing the initial dip estimate at the second sampling point that lies nearest the midpoint of the center trace within said second time window with a final dip estimate as represented by the median value determined for that sampling point in step (a), and (c) incrementing said second time window along the time axis of said set of traces and repeating steps (a) and (b) for each second time window position to obtain a plurality of final dip estimates.

3. The method of claim 2 wherein only the center trace and a selected number of contiguous traces lying on either side of the center trace are utilized in the median value determination of step (a).

4. The method of claim 2 wherein said second sampling points within said second time window are spaced along the time axis in time increments greater than the spacing of said first sampling points within said first time window and further including the step of selectively replacing the initial dip estimates at said first sampling points with the final dip estimates at said second sampling points.

* * * * *